United States Patent
Piwowar et al.

(10) Patent No.: US 12,173,452 B2
(45) Date of Patent: Dec. 24, 2024

(54) PAPER COATED WITH A FUNCTIONAL POLYOLEFIN FILM

(71) Applicant: Dow Global Technologies LLC, Midland, MI (US)

(72) Inventors: Alan M. Piwowar, Midland, MI (US); Ray E. Drumright, Midland, MI (US); Christina N. Ellison, Saginaw, MI (US); David L. Malotky, Midland, MI (US); Jonathan F. Mason, Midland, MI (US); Hari Katepalli, Midland, MI (US); Luqing Qi, Midland, MI (US); Houxiang Tang, Midland, MI (US); Robert R. Bills, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 165 days.

(21) Appl. No.: 17/917,684

(22) PCT Filed: Apr. 15, 2021

(86) PCT No.: PCT/US2021/027421
§ 371 (c)(1),
(2) Date: Oct. 7, 2022

(87) PCT Pub. No.: WO2021/225764
PCT Pub. Date: Nov. 11, 2021

(65) Prior Publication Data
US 2023/0151549 A1 May 18, 2023

Related U.S. Application Data

(60) Provisional application No. 63/020,322, filed on May 5, 2020.

(51) Int. Cl.
| | |
|---|---|
| *D21H 17/37* | (2006.01) |
| *D21H 19/20* | (2006.01) |
| *D21H 21/02* | (2006.01) |
| *D21H 21/16* | (2006.01) |

(52) U.S. Cl.
CPC ............ *D21H 17/37* (2013.01); *D21H 19/20* (2013.01); *D21H 21/02* (2013.01); *D21H 21/16* (2013.01)

(58) Field of Classification Search
CPC ........ D21H 17/37; D21H 19/20; D21H 21/02; D21H 21/16; D21H 17/35; D21H 17/72; D21H 17/74; D21H 27/10; C08L 23/0815; C09D 4/00; C09D 123/0815
See application file for complete search history.

(56) References Cited

U.S. PATENT DOCUMENTS

| | | |
|---|---|---|
| 4,351,931 A | 9/1982 | Armitage |
| 7,763,676 B2 | 7/2010 | Moncla et al. |
| 7,935,755 B2 | 5/2011 | Moncla et al. |
| 8,053,503 B2 | 11/2011 | Moncla et al. |
| 8,193,275 B2 | 6/2012 | Moncla et al. |
| 8,722,787 B2 | 5/2014 | Romick et al. |
| 8,779,053 B2 | 7/2014 | Lundgard et al. |
| 9,169,406 B2 | 10/2015 | Wilbur et al. |
| 10,612,193 B2 | 4/2020 | Katzenstein et al. |
| 2005/0100754 A1 | 5/2005 | Moncla et al. |
| 2006/0063877 A1 | 3/2006 | Gaschler et al. |
| 2013/0149453 A1* | 6/2013 | Romick ................ B32B 15/085 524/504 |
| 2015/0337140 A1 | 11/2015 | Romick et al. |
| 2016/0145806 A1 | 5/2016 | Rhee |
| 2017/0183506 A1 | 6/2017 | Romick et al. |
| 2018/0363248 A1* | 12/2018 | Katzenstein ........... D21H 19/58 |

FOREIGN PATENT DOCUMENTS

EP 3415688 A1 12/2018

* cited by examiner

*Primary Examiner* — Jacob T Minskey
*Assistant Examiner* — Matthew M Eslami
(74) *Attorney, Agent, or Firm* — Karl E. Stauss

(57) ABSTRACT

The present invention relates to an article and a method for its preparation; the article comprises a cured polymeric film superposing paper or paperboard. The polymeric film is derived from a dispersion which comprises:
  a) a dispersant which is a copolymer with an acid value of 130 or less, comprising structural units of ethylene and a carboxylic acid monomer, wherein the copolymer has a melt flow index in the range of from 50 to 2000 g/10 min at 190° C./2.16 kg; wherein the weight-to-weight ratio of structural units of ethylene to carboxylic acid monomer is in the range of from 95:5 to 70:30; and wherein the dispersant has a concentration in the range of from 9 to 50 weight percent based on the weight of polymer solids in the dispersion;
  b) a base polymer comprising non-functionalized ethylene-co-alkene copolymers, wherein the weight-to-weight ratio of the structural units of ethylene to alkene is in the range of from 99.8:0.2 to 50:50; and
  c) a neutralizing agent which is a hard base and excludes an organic base having a boiling point of less than 250° C.; wherein the concentration of the neutralizing agent is sufficient to neutralize at least half of the carboxylic acid groups associated with the dispersion composition.

The article of the present invention is useful as a barrier to a wide range of hydrophobic and hydrophilic materials.

8 Claims, No Drawings

PAPER COATED WITH A FUNCTIONAL POLYOLEFIN FILM

The present invention relates to an article comprising paper coated with an aqueous dispersion of polyolefin particles as well as paper coated with a polyolefin film arising from this dispersion.

Coating of paper or paperboard for use in a range of applications is known to provide barriers to a wide range of substances including water, oil, and acids. Typically, high performance coatings, such as those used for paper drink cups, are prepared by extrusion coating or lamination of a melted polyolefin resin directly onto the paper. This process provides continuous coverage over the substrate and prevents liquid placed into the cup from either contaminating the paper or soaking through completely, thereby causing structural failure of the article.

Liquid applied barrier coatings for paper and paperboard have been described in the art. United States Patent Publication 2006/0063877 describes an aqueous dispersion of an olefin copolymer that is useful in paper coating applications to improve brightness. United States Patent Publication 2016/0145806 discloses a dispersible ethylene-(meth) acrylic acid co-polymer for use as a water-repellency layer, requiring separate layers to achieve a broad range of barriers to hydrophobic and hydrophilic materials.

United States Patent Publication 2018/0363248 discloses a way to prepare a coated paper or paperboard with a relatively thin coating of an omniphobic barrier layer that maintains stain resistance to a wide variety of substances. The dispersion to form the omniphobic barrier layer comprises water, a dispersant, a base polymer, and a neutralizing agent; wherein the dispersant is a copolymer comprising structural units of ethylene and a carboxylic acid monomer; wherein the base polymer comprises structural units of ethylene and a $C_1$-$C_{12}$-alkyl acrylate or methacrylate; wherein the neutralizing agent is ammonia or an organic base having a boiling point of less than 250° C.; and wherein the concentration of the neutralizing agent is sufficient to neutralize at least half of the carboxylic acid groups associated with the dispersant.

Alternative omniphobic barrier layers are needed that do not require ammonia or an organic base as a neutralizing agent and do not require a base polymer to comprise structural units of ethylene and a $C_1$-$C_{12}$-alkyl acrylate or methacrylate. Emissions from ammonia or volatile organic bases are malodorous and can be subject to government regulations and/or have safety issues related to exposure levels.

The present invention provides a process for preparing an omniphobic single layered coating onto paper or paperboard comprising the steps of:
a) applying onto paper or paperboard a dispersion composition comprising water, a dispersant, a base polymer, and a neutralizing agent; and
b) heating the composition to produce a cured film having a thickness in the range of 1 to 20 g/m²;
wherein the sum of the dispersant and the base polymer comprise from 10 to 100 percent of the weight of polymer solids in the dispersion; wherein
the dispersant is a copolymer with an acid value of 130 or less, comprising structural units of ethylene and a carboxylic acid monomer, wherein the copolymer has a melt flow index in the range of from 50 to 2000 g/10 min at 190° C./2.16 kg; wherein the weight-to-weight ratio of structural units of ethylene to carboxylic acid monomer is in the range of from 95:5 to 70:30; and wherein the dispersant has a concentration in the range of from 9 to 50 weight percent based on the weight of polymer solids in the dispersion, provided that the concentration of the dispersant in the composition is sufficient to form a cured film with a Cobb value of less than 18 g/m² and oil contamination of less than 25 percent;
the base polymer comprises non-functionalized ethylene-co-alkene copolymers, wherein the weight-to-weight ratio of the structural units of ethylene to alkene is in the range of from 99.8:0.2 to 50:50; and
wherein the neutralizing agent is a hard base and excludes an organic base having a boiling point of less than 250° C.; wherein the concentration of the neutralizing agent is sufficient to neutralize at least half of the carboxylic acid groups present in the dispersion composition.

The present invention further provides an article made according to the process of the present invention.

The composition, which is an aqueous dispersion comprising the dispersant, the base polymer, and the neutralizing agent may be prepared by a continuous or batch process. An example of a preferred continuous process is twin screw extrusion, as described in U.S. Pat. No. 8,722,787, Comparative Example E. A batch process can be carried out, for example, using a 2CV Helicone mixer, which is a conical batch mixer that uses dual intermeshing conical blades to mix high viscosity materials. The concentration of polymers in the aqueous dispersion is preferably in the range from 20, more preferably from 25, and most preferably from 30 weight percent, to preferably 60 and more preferably to 55 weight percent, based on the weight of water and the polymers combined.

The dispersant is a copolymer with an acid value of 130 or less, comprising structural units of ethylene and a carboxylic acid monomer, such as methacrylic acid, or itaconic acid. Preferably the dispersant is a copolymer comprising structural units of ethylene and methacrylic acid (EMAA). Preferably the dispersant has an acid value of less than 100. Most preferably the dispersant is EMAA with an acid value of 90-100. The term "acid value" refers to the mass of potassium hydroxide (KOH) in milligrams that is required to neutralize one gram of copolymer and is determined by ASTM (D974). The term "structural unit" of the named monomer refers to the remnant of the monomer after polymerization. For example, a structural unit of methacrylic acid is as illustrated:

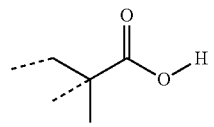

structural unit of methacrylic acid where the dotted lines represent the points of attachment of the structural unit to the polymer backbone.

The dispersant copolymer has a melt flow index in the range of from 50 to 2000 g/10 min at 190° C./2.16 kg (according to ASTM D1238) and the weight-to-weight ratio of structural units of ethylene to carboxylic acid monomer is in the range of from 95:5, preferably from 90:10, and more preferably from 85:15 weight percent; to 70:30, and preferably to 75:25 weight percent, based on the weight of the dispersant copolymer. The concentration of the dispersant is preferably in the range of from 10, more preferably from 15 weight percent, more preferably from 25 weight percent, preferably to 40, more preferably to 30 weight percent, based on the weight of polymer solids in the dispersion; provided that the concentration of the dispersant in the composition is sufficient to yield a cured film with a Cobb value of less than 18 g/m², preferably less than 15 g/m² and more preferably less than 10 g/m² and oil contamination of less than 25 percent, preferably less than 10 percent, more preferably less than 5 percent, most preferably 0 percent. Most preferably the concentration of the dispersant in the composition is in the range of from 15 to 25 weight percent, based on the weight of polymer solids in the dispersion; provided that the concentration of the dispersant in the composition is sufficient to form a cured film with a Cobb value as described. The concentration of the dispersant in the composition depends on the acid value of the dispersant, so that higher acid value dispersants require a lower concentration than lower acid value dispersants. When the dispersant has an acid value of 130, the concentration of the dispersant in the composition is preferably up to 20 weight percent, based on the weight of polymer solids in the dispersion. A suitable commercially available dispersant includes NUCREL™ 960 (an EMAA copolymer with an acid value of 98).

The base polymer comprises non-functionalized ethylene-co-alkene copolymers, wherein the weight-to-weight ratio of the structural units of ethylene to alkene is in the range of from 99.8:0.2, preferably from 99.7:0.3; and more preferably from 99.6:0.4; to 50:50, more preferably to 60:40; and most preferably to 65:35. Preferred base polymers include ethylene-co-octene, ethylene-co-hexene, ethylene-co-butene copolymers, or mixtures thereof. Optionally the base polymer can also include functionalized ethylene copolymer comprising structural units of a $C_1$-$C_{12}$-alkyl acrylate or methacrylate; though preferably the base polymer has no functionalized ethylene copolymer comprising structural units of a $C_1$-$C_{12}$-alkyl acrylate or methacrylate.

The concentration of base polymer in the composition is sufficient to form a cured film with a Cobb value of less than 18 g/m², preferably less than 15 g/m² and more preferably less than 10 g/m² and oil contamination of less than 25 percent, preferably less than 10 percent, more preferably less than 5 percent, most preferably 0 percent. Preferably, the concentration of the base polymer is preferably in the range of from 1, more preferably from 2, to 90, more preferably to 80, and most preferably to 75 weight percent, based on the weight of polymer solids in the dispersion. Commercial examples of base polymers include: ENGAGE™ 8200G (an ethylene octene copolymer having a melt index (190° C./2.16 Kg) of 5 g/10 min per ASTM D1238), ENGAGE™ 8401 (an ethylene octene copolymer having a melt index (190° C./2.16 Kg) of 30 g/10 min per ASTM D1238), AMPLIFY™ EA103 (a poly(ethylene-co-ethyl acrylate) copolymer with 19.5% ethyl acrylate and a melt index (190° C./2.16 Kg) of 21 g/10 min per ASTM D1238), AFFINITY™ EG8200G (an ethylene octene copolymer having a melt index (190° C./2.16 Kg) of 5.0 g/10 min per ASTM D1238); all available from Dow, Inc. or its affiliates.

The neutralizing agent is a hard base, such as potassium hydroxide (KOH), sodium hydroxide (NaOH) and/or lithium hydroxide (LiOH) and excludes an organic base having a boiling point of less than 250° C., such as ammonia or an amine, N,N-dimethylethanolamine (DMEA), diethylamine, and morpholine. The concentration of neutralizing agent is sufficiently high to neutralize at least half of the carboxylic acid groups present in the dispersion composition. For example, if the dispersion composition comprises 0.05 mol of carboxylic acid groups in a given mass, at least 0.025 mol of a hard base such as KOH would be required. Thus, the molar ratio of basic functionality in the neutralizing agent to carboxylic acid groups in the dispersion composition is at least 0.5:1. Preferably the ratio is in the range of from 0.7:1, more preferably from 0.9:1, to 1.4:1, to preferably 1.2:1, and more preferably to 1:1.

The composition may optionally comprise other components including polymeric coupling agents to improve the compatibility between the dispersant and the base polymer. An example of a suitable coupling agent includes ethylene-co-maleic anhydride, which, when used, is present at a concentration in the range of from 5 weight percent to 20, more preferably to 10 weight percent based on the weight of polymer solids in the dispersion. A commercial example of a coupling agent includes: LICOCENE™ 431 stabilized maleic anhydride grafted polyethylene wax (sometimes referred to as MA-g-PE), available from Clariant Corporation or its affiliates. It is expected that the amount of neutralizing agent will be adjusted based on the total acid of the dispersion composition when additional components are added.

The composition may optionally comprise up to 5 weight percent, based the weight of polymer solids in the dispersion, of a wax such as ethylene bis(stearamide) and polyolefin waxes such as the commercially available POLYWAX™ 655 polyethylene available from Baker Hughes, Inc. or its affiliates, or ACRAWAX™ C (N,N'ethylene bisstearamide) available from Lonza or its affiliates.

The composition may optionally be mixed or formulated with one or more additional components as those skilled in the art can appreciate, such as for example, other water-based dispersions, pigments, wetting agents, defoamers, solvents, rheology modifiers, surfactants, anti-oxidants, and other processing aids to improve barrier and performance attributes of the coated paperboard. Such improvements include for example, compatibility with a substrate, dispersion wet out, coating flexibility, coating integrity upon exposure to extremes in temperature or radiation, flowablity, heat seal, and other attributes, as well as to lower cost in use.

The composition can be applied to paper or paperboard using traditional wet applications known to those skilled in the art, such as a wire wound drawdown bar. The wet film can then heated to remove water, preferably to a temperature in the range of from 50° C., more preferably from 70° C. to preferably 150° C., more preferably 120° C. to provide a coat weight of from 1, preferably from 2, more preferably from 4, and most preferably from 6 g/m², to 20, preferably to 15, more preferably to 12, and most preferably 10 g/m². The paper or paperboard may be uncoated or pre-coated.

A very thin layer of a film with low water uptake and high oil resistance (an omniphobic film) can be coated onto paper or paperboard; moreover, the application can be done in a single pass because the omniphobic properties are present in base polymer and the dispersant in the applied aqueous composition. It has been surprisingly discovered that use of a hard base in combination with a copolymer dispersant having an acid value of 130 or less, particularly an EMAA copolymer dispersant, provides a polyolefin dispersion composition with excellent water and oil barrier properties when applied and cured on paper and paperboard without requiring the use of undesirable low boiling point neutralizing agents. Additionally, such compositions do not necessarily require functionalized ethylene copolymer comprising structural units of a $C_1$-$C_{12}$-alkyl acrylate or methacrylate to provide coatings with oil/grease resistance and has no observed adhesion issues to pre-coated paper and board.

Sample Preparation

Coating formulations were prepared by applying polyolefin dispersion compositions to an uncoated substrate. The substrate was 203 g/m² uncoated solid bleached sulphate (SBS) paperboard. Coatings of paper and paperboard samples were prepared by hand using either a #10, #12, or #30 wire-wound drawdown bar. Samples were cured in a Fisher Scientific Isotemp 180L Oven FA oven at 100° C. for 2 min.

Coat Weight Measurements

The coat weight of samples was measured by cutting out 7.17 in² (46.26 cm²) sections coated and uncoated paper, then placing the sections in an oven at 100° C. for 2 min. All the samples were then weighed and the coat weight was determined by the difference between the coated and uncoated samples.

Water Uptake Measurements

Water uptake testing was performed in a modified version of TAPPI method T441 "Water absorptiveness of sized (non-bilious) paper, paperboard, and corrugated fiberboard (Cobb test)." Samples of coated paper or paperboard were prepared using the above method and then cut into 25-cm² round samples using a circular die and pneumatic press. A round sample was placed in an oven at 100° C. for 2 min, then removed and weighed, then placed on a rubber mat; a circular metal ring was affixed on top of the round sample and clamped to prevent water leakage. Water at 90° C. was then poured over the sample to a height of 1 cm (25 mL of test liquid) and allowed to stand for 2 min. At the end of the test period, the test liquid was poured off and the coated sample was placed between two sheets of blotter paper. A 10-kg metal roller was passed over the sample twice. Finally, the sample was weighed and the water uptake was calculated based on the difference in mass between the exposed and unexposed sample. Cobb values are reported in units of g/m2. Cobb values of up to 18 g/m2 are reported as passing the test.

Oil and Grease Resistance Measurements

Oil and grease resistance of coatings was performed using a modified Ralston Purina 2 test method. The coated paper or paperboard was cut into a 2"×2" square test sample and weighed. The test sample was placed on a sheet of standard graph paper with a ¼" grid, which paper was fixed on a metal sheet. Two 1" cotton flannel rounds saturated with vegetable oil were placed in the center of the coated paper or paperboard. The rounds were held in place by a brass weight with a diameter and a length of 1 inch. Samples of coated paper and paperboard cut to the same dimensions were also placed on the metal sheet to measure water loss by the paper substrate during subsequent heat aging. The samples were heat-aged in an oven at 60° C. for 24 h, after which time the samples were allowed to cool to room temperature. The weight and the cotton rounds were removed and excess oil was blotted off with a paper towel. Finally, the samples were weighed and the oil uptake (in g/m²) was calculated based on mass difference correcting for water loss; the graph paper was examined to determine the percentage of the squares contaminated by oil break-through (referred to in the Table as "OGR % contamination"). Oil contamination values of less than 25 percent are reported as passing the test.

The examples and comparative example(s) utilize the following compositions: NUCREL™ 960 (an EMAA copolymer with an acid value of 98 and melt index of 60 g/10 min @190° C./21.6 kg per ASTM D1238), available from Dow, Inc. or its affiliates; experimental EMAA copolymer A-2030 (an EMAA copolymer with an acid value of 130 and melt index of 300 g/10 min @190° C./21.6 kg per ASTM D1238); experimental EMAA copolymer B-X74 (an EMAA copolymer with an acid value of 98 and melt index of 220 g/10 min @190° C./21.6 kg per ASTM D1238); PRIMACOR™ 5980i copolymer (an ethylene acrylic acid copolymer (20.5 wt % acrylic acid), which has a melt index of 300 g/10 minute per ASTM Method D1238 at 190° C./2.16 kg), available from SK Global Chemical Co., LTD. or its affiliates. AFFINITY EG™ 8200G (an ethylene octene copolymer having a melt index (190° C./2.16 Kg) of 5 g/10 min per ASTM D1238), ENGAGE™ 8401 (an ethylene octene copolymer having a melt index (190° C./2.16 Kg) of 30 g/10 min per ASTM D1238), AMPLIFY™ EA103 (a poly(ethylene-co-ethyl acrylate) copolymer with 19.5% ethyl acrylate and a melt index (190° C./2.16 Kg) of 21 g/10 min per ASTM D1238); all available from Dow, Inc. or its affiliates; potassium hydroxide (KOH) and dimethylethanolamine (DMEA); LICOCENE™ 431 stabilized maleic anhydride grafted polyethylene wax (sometimes referred to as MA-g-PE), available from Clariant Corporation or its affiliates; and ACRAWAX™ C (N,N'ethylene bisstearamide) available from Lonza or its affiliates. Experimental EMAA copolymers A and B may be prepared by standard free-radical copolymerization methods, using high pressure, operating in a continuous manner Monomers are fed into the reaction mixture in a proportion which relates to the monomer's reactivity, and the amount desired to be incorporated. In this way, uniform, near-random distribution of monomer units along the chain is achieved. Polymerization in this manner is well known and is described for example, in U.S. Pat. No. 4,351,931 (Armitage).

EXAMPLES

Example 1—Preparation of an Aqueous Dispersion of Amplify™ EA103 Base Polymer, Dispersant, Polymeric Coupling Agent, Wax and Engage™ 8401 Base Polymer at a 5:15:10:1.5:68.5 w/w/w/w/w Ratio Amplify™ EA103 (5 weight percent of polymer solids), Nucrel™ 960 (15 weight percent of polymer solids), MA-g-PE (10 weight percent of polymer solids), Acrawax™ C (1.5 weight percent of polymer solids) and Engage™ 8401 (68.5 weight percent of polymer solids) were fed individually and concurrently from separate hoppers at the specified relative weights at a rate of 10 lbs/h (4.5 kg/h) into a 25 mm Bersdorff™ ZE25 UTX extruder with 48 L/D (rotating at 450 rpm). The extruder temperature profile was ramped to 150° C. prior to the introduction, through ISCO pumps, of water (21.3 mL/min at 123° C. and 346 psi) and 30 wt % KOH (3.4 mL/min) separately and concurrently. Dilution water (80 mL/min at 123° C. and 550 psi) was then added and the mixture was cooled to 97° C. at the extruder outlet. A back-pressure regulator was used at the extruder outlet to adjust the pressure in the extruder barrel to reduce steam formation. The resulting dispersion was cooled and filtered through a 200-μm filter and deemed good quality based on low grit retention (<100 ppm), colloidal stability (no phase separation with 48 hours of production), dispersion solids (close to percent solids added to extruder) and particle size (<3 μm, as determined using a Coulter LS320 particle size analyzer or comparable tool)).

Example 2—Preparation of an Aqueous Dispersion of Base Polymer and Dispersant at a 80/20 w/w Ratio ENGAGE™ 8200 (80 weight percent of polymer solids) and experimental copolymer B-X74 (20 weight percent of polymer solids) were fed individually and concurrently from separate hoppers at the specified relative weights at a rate of 10 lbs/h (4.5 kg/h) into a 25 mm Bersdorff™ ZE25 UTX extruder with 48 L/D (rotating at 450 rpm). The extruder temperature profile was ramped to 140° C. prior to the introduction, through ISCO pumps, of water (17.5 mL/min at 117° C. and 211 psi) and 30 wt % KOH (3.27 mL/min) separately and concurrently. Dilution water (100 mL/min at 127° C. and 86 psi) was then added. A back-pressure regulator was used at the extruder outlet to adjust the pressure in the extruder barrel to reduce steam formation. The resulting dispersion was cooled and filtered through a 200-μm filter.

Example 3 utilizes the procedure of Example 1, but without Amplify™ EA103 and with the components as shown in Table 1. Examples 4-6 utilize the procedure of Example 2 with the components as shown in Table 1.

Example 7—Preparation of an Aqueous Dispersion of Base Polymer and Dispersant at a 60/40 w/w Ratio AFFINITY™ EG8200G (60 weight percent of polymer solids) and NUCREL™ 960 (40 weight percent of polymer solids) were fed individually and concurrently from separate hoppers at the specified relative weights at a rate of 600 lbs/h (272 kg/h) into a 58 mm Coperion™ ZSK extruder with 48 L/D (rotating at 1110 rpm). The extruder temperature profile was ramped to 150° C. prior to the introduction, through ISCO pumps, of water (2.55 L/min at 113° C. and 310 psi) and 30 wt % KOH (0.35 L/min) separately and concurrently. Dilution water (5.12 L/min at 117° C. and 310 psi) was then added and the mixture was cooled to 101° C. at the extruder outlet. A back-pressure regulator was used at the extruder outlet to adjust the pressure in the extruder barrel to reduce steam formation. The resulting dispersion was then further cooled to 34° C. through an in line cooler.

Example 8—Preparation of an Aqueous Dispersion of Base Polymer and Dispersant at a 85/15 w/w Ratio AFFINITY™ EG8200G (85 weight percent of polymer solids) and experimental copolymer A (15 weight percent of polymer solids) were fed individually and concurrently from separate hoppers at the specified relative weights at a rate of 10 lbs/h (4.5 kg/h) into a 25 mm Bersdorff™ ZE25 UTX extruder with 48 L/D (rotating at 450 rpm). The extruder temperature profile was ramped to 140° C. prior to the introduction, through ISCO pumps, of water (10.65 mL/min at 94° C. and 210 psi) and 30 wt % KOH (3.26 mL/min) separately and concurrently. Dilution water (100 mL/min at 86° C. and 500 psi) was then added. A back-pressure regulator was used at the extruder outlet to adjust the pressure in the extruder barrel to reduce steam formation. The resulting dispersion was cooled and filtered through a 200-μm filter.

Examples 9-12 utilize the procedure of Example 7 with the components as shown in Table 1.

Example 13—Preparation of an Aqueous Dispersion of Amplify™ EA103 Base Polymer, Dispersant, Polymeric Coupling Agent, Wax and Engage™ 8401 Base Polymer at a 5:8:10:1.5:75.5 w/w/w/w/w Ratio EA103 (5 weight percent of polymer solids), PRIMACOR™ 5980i (8 weight percent of polymer solids), MA-g-PE (10 weight percent of polymer solids), Acrawax™ C (1.5 weight percent of polymer solids) and 8401 (75.5 weight percent of polymer solids) were fed individually and concurrently from separate hoppers at the specified relative weights at a rate of 10 lbs/h (4.5 kg/h) into a 25 mm Bersdorff™ ZE25 UTX extruder with 48 L/D (rotating at 450 rpm). The extruder temperature profile was ramped to 150° C. prior to the introduction, through ISCO pumps, of water (7.7 mL/min at 115° C. and 250 psi) and 30 wt % KOH (3.1 mL/min) separately and concurrently. Dilution water (80 mL/min at 104° C. and 550 psi) was then added and the mixture was cooled to 97° C. at the extruder outlet. A back-pressure regulator was used at the extruder outlet to adjust the pressure in the extruder barrel to reduce steam formation. The resulting dispersion was cooled and filtered through a 200-μm filter.

Examples 14-17 utilize the procedure of Example 13 with the components as shown in Table 1.

Example 18—Preparation of an Aqueous Dispersion of Base Polymer and Dispersant at a 60/40 w/w Ratio AFFINITY™ EG8200 (60 weight percent of polymer solids) and PRIMACOR™ 5980 (40 weight percent of polymer solids) were fed individually and concurrently from separate hoppers at the specified relative weights at a rate of 600 lbs/h (272 kg/h) into a 58 mm Coperion™ ZSK extruder with 48 L/D (rotating at 1110 rpm). The extruder temperature profile was ramped to 150° C. prior to the introduction, through ISCO pumps, of water (0.79 L/min at 109° C. and 312 psi) and 30 wt % KOH (0.64 L/min) separately and concurrently. Dilution water (5.24 L/min at 106° C. and 312 psi) was then added and the mixture was cooled to 101° C. at the extruder outlet. A back-pressure regulator was used at the extruder outlet to adjust the pressure in the extruder barrel to reduce steam formation. The resulting dispersion was then further cooled to 37 C through an in line cooler.

Example 19—Preparation of an Aqueous Dispersion of Amplify™ EA 103 Base Polymer, Dispersant, Polymeric Coupling Agent, Wax and Engage™ 8401 Base Polymer at a 5:15:10:1.5:68.5 w/w/w/w/w Ratio Amplify™ EA103 (5 weight percent of polymer solids), Nucrel™ 960 (15 weight percent of polymer solids), MA-g-PE (10 weight percent of polymer solids), Acrawax™ C (1.5 weight percent of polymer solids) and Engage™ 8401 (68.5 weight percent of polymer solids) were fed individually and concurrently from separate hoppers at the specified relative weights at a rate of 10 lbs/h (4.5 kg/h) into a 25 mm Bersdorff™ ZE25 UTX extruder with 48 L/D (rotating at 450 rpm). The extruder temperature profile was ramped to 130° C. prior to the introduction, through ISCO pumps, of water (13.85 mL/min at 28° C. and 501 psi) and 100 wt % DMEA (3.88 mL/min) separately and concurrently. Dilution water (110 mL/min at 21° C. and 600 psi) was then added. A back-pressure regulator was used at the extruder outlet to adjust the pressure in the extruder barrel to reduce steam formation. The resulting dispersion was cooled and filtered through a 200-μm filter. This filtration operation proceeded much more slowly than the other examples, and 18% of the added solids was removed during the filtration. Both of these results are indicative of a very poor quality dispersion. The quality of all previous dispersion examples could be described as good.

Example 20 utilizes the procedure of Example 19 with the components as shown in Table 1. As with Example 19, filtration proceeded very slowly, but there was no corresponding removal of large amounts of polymer solids. This dispersion was considered poor in quality due to high levels of grit (>100 ppm), dispersion solids (25% lower than solids added to extruder) and particle size (>10 μm).

Table 1 illustrates a summary of the sample compositions

TABLE 1

Sample Compositions

| Ex. | Components | Composition | Base | DoN | Dispersant Comonomer | Dispersant Acid value | Dispersant Wt. % |
|---|---|---|---|---|---|---|---|
| 1 | Engage 8401/ Amplify EA103/ Licocene 431/ Nucrel 960/ Acrawax C | 68.5/5/10/15/1.5 | KOH | 90% | EMAA | 98 | 15 |
| 2 | Engage 8200/ B-X74 | 80/20 | KOH | 85% | EMAA | 98 | 20 |
| 3 | Engage 8401/ Licocene 431/ Nucrel 960/ Acrawax C | 68.5/10/20/1.5 | KOH | 90% | EMAA | 98 | 20 |
| 4 | Engage 8200/ B-X74 | 75/25 | KOH | 85% | EMAA | 98 | 25 |
| 5 | Engage 8200/ B-X74 | 70/30 | KOH | 85% | EMAA | 98 | 30 |
| 6 | Engage 8200/ B-X74 | 65/35 | KOH | 85% | EMAA | 98 | 35 |
| 7 | Affinity EG8200/ Nucrel 960 | 60/40 | KOH | 85% | EMAA | 98 | 40 |
| 8 | Affinity EG8200/ A-2030 | 85/15 | KOH | 85% | EMAA | 130 | 15 |
| 9 | Affinity EG8200/ A-2030 | 80/20 | KOH | 85% | EMAA | 130 | 20 |
| 10 | Affinity EG8200/ A-2030 | 75/25 | KOH | 85% | EMAA | 130 | 25 |
| 11 | Affinity EG8200/ A-2030 | 70/30 | KOH | 85% | EMAA | 130 | 30 |
| 12 | Affinity EG8200/ A-2030 | 60/40 | KOH | 85% | EMAA | 130 | 40 |
| 13 | Engage 8401/ Amplify EA103/ Licocene 431/ PRIMACOR 5980i/ Acrawax C | 75.5/5/10/8/1.5 | KOH | 90% | EAA | 155 | 8 |
| 14 | Engage 8401/ Amplify EA103/ Licocene 431/ PRIMACOR 5980i/ Acrawax C | 73/5/10/10/1.5 | KOH | 90% | EAA | 155 | 10 |
| 15 | Engage 8401/ Amplify EA103/ Licocene 431/ PRIMACOR 5980i/ Acrawax C | 71/5/10/12.5/1.5 | KOH | 90% | EAA | 155 | 12.5 |
| 16 | Engage 8401/ Amplify EA103/ Licocene 431/ PRIMACOR 5980i/ Acrawax C | 68.5/5/10/15/1.5 | KOH | 90% | EAA | 155 | 15 |
| 17 | Engage 8401/ Amplify EA103/ Licocene 431/ PRIMACOR 5980i/ Acrawax C | 45.5/18/10/25/1.5 | KOH | 80% | EAA | 155 | 25 |
| 18 | Affinity EG8200/ PRIMACOR 5980i | 60/40 | KOH | 85% | EAA | 155 | 40 |
| 19 | Engage 8401/ Amplify EA103/ Licocene 431/ Nucrel 960/ Acrawax C | 68.5/5/10/15/1.5 | DMEA | 150% | EMAA | 98 | 15 |
| 20 | Engage 8401/ Amplify EA103/ Licocene 431/ Nucrel 960/ Acrawax C | 68.5/5/10/15/1.5 | DMEA | 90% | EMAA | 98 | 15 |

DoN means Degree of Neutralization

Water Uptake and Oil/Grease Resistance Testing

All samples were cured at 100° C. for 2 min. All Cobb data was generated at 90° C. water for 2 min. The target Cobb value for water uptake was <10 g/m². The target value for oil uptake was <15 g/m² and the target value for contamination was 0%. Table 2 illustrates the coat weights, Cobb values, oil uptake values and contamination percentage results for all the samples.

TABLE 2

Water Uptake and Oil/Grease Resistance Results

| Ex | Coat Wt g/m2 | Cobb Pass/Fail | Cobb g/m2 | OGR Pass/Fail | OGR % contamination |
|---|---|---|---|---|---|
| 1 | 11 | Pass | 7 | Pass | 0% |
| 2 | 7 | Pass | 6 | Pass | 0% |
| 3 | 11 | Pass | 4 | Pass | 0% |
| 4 | 8 | Pass | 7 | Pass | 0% |
| 5 | 8 | Pass | 7 | Pass | 0% |
| 6 | 10 | Pass | 6 | Pass | 0% |
| 7 | 8 | Pass | 5 | Pass | 0% |
| 8 | 8 | Pass | 7 | Pass | 0% |
| 9 | 8 | Pass | 10 | Pass | 0% |
| 10 | 6 | Fail | 27 | Pass | 0% |
| 11 | 9 | Fail | 50 | Pass | 0% |
| 12 | 19 | Fail | 94 | Pass | 0% |
| 13 | 11 | Pass | 12 | Fail | 100% |
| 14 | 12 | Pass | 10 | Fail | 100% |
| 15 | 12 | Fail | 49 | Fail | 100% |
| 16 | 10 | Fail | 82 | Fail | 67% |
| 17 | 8 | Fail | 160 | Pass | 0 |
| 18 | 8 | Fail | 209 | Pass | 6.3% |
| 19 | 11 | Pass | 4.2 | Fail | 63% |
| 20 | 14 | Pass | 5.7 | Fail | 100% |

Examples 1, 19 and 20 results show that the use of KOH in place of DMEA in the dispersion improves performance characteristics of the coated paperboard. Table 1 shows the importance of the dispersant acid value and the total amount of acid in the dispersion on properties of the coated paperboard.

The invention claimed is:

1. A process for preparing an omniphobic single layered coating onto paper or paperboard comprising the steps of:
   a) applying onto paper or paperboard a dispersion composition comprising water, a dispersant, a base polymer, and a neutralizing agent; and
   b) heating the composition to produce a cured film having a thickness in the range of 1 to 20 g/m²;
   wherein the sum of the dispersant and the base polymer comprise from 10 to 100 percent of the weight of polymer solids in the dispersion; wherein
   the dispersant is a copolymer with an acid value of 130 or less, comprising structural units of ethylene and a carboxylic acid monomer, wherein the copolymer has a melt flow index in the range of from 50 to 2000 g/10 min at 190° C./2.16 kg; wherein the weight-to-weight ratio of structural units of ethylene to carboxylic acid monomer is in the range of from 95:5 to 70:30;
   and wherein the dispersant has a concentration in the range of from 9 to 50 weight percent based on the weight of polymer solids in the dispersion, provided that the concentration of the dispersant in the composition is sufficient to form a cured film with a Cobb value of less than 18 g/m² and oil contamination of less than 25 percent;
   the base polymer comprises non-functionalized ethylene-co-alkene copolymers, wherein the weight-to-weight ratio of the structural units of ethylene to alkene is in the range of from 99.8:0.2 to 50:50, has no copolymer comprising structural units of ethylene and a $C_1$-$C_{12}$-alkyl acrylate or methacrylate, and has a concentration in the range of from 1 to 90 weight percent, based on the weight of polymer solids in the dispersion; and
   wherein the neutralizing agent is a hard base and excludes an organic base having a boiling point of less than 250° C.; wherein the concentration of the neutralizing agent is sufficient to neutralize at least half of the carboxylic acid groups present in the dispersion composition.

2. The process of claim 1 wherein the cured film has a thickness in the range of from 2 to 12 g/m²; wherein
   the dispersant is a copolymer of ethylene and methacrylic acid;
   the base polymer is ethylene-co-octene, ethylene-co-hexene, ethylene-co-butene copolymers, or mixtures thereof; and
   the neutralizing agent is potassium hydroxide.

3. The process of claim 2 wherein the cured film has a thickness in the range of from 4 to 10 g/m², wherein the concentration of structural units of ethylene to structural units of methacrylic acid in the dispersant is in the range of from 99.5:0.5 to 75:25; the concentration of the dispersant in the composition is in the range of from 10 to 40 percent based on the weight of polymer solids in the dispersion; and wherein the concentration of the base polymer in the composition is in the range of from 50 to 90 percent based on the weight of polymer solids in the dispersion.

4. The process of claim 1 wherein the composition further comprises from 5 to 10 weight percent of a polymeric coupling agent, based on the weight of polymer solids in the dispersion.

5. The process of claim 1 wherein the composition further comprises up to 5 weight percent of a wax, based on the weight of polymer solids in the dispersion.

6. An article made according to the process of claim 1.

7. The process of claim 1 wherein the dispersant has an acid value of less than 100.

8. The process of claim 2 wherein the dispersant has an acid value of 90 to 100.

* * * * *